United States Patent
Wong et al.

(10) Patent No.: US 9,588,931 B2
(45) Date of Patent: Mar. 7, 2017

(54) COMMUNICATION BRIDGING BETWEEN DEVICES VIA MULTIPLE BRIDGE ELEMENTS

(71) Applicant: Silicon Image, Inc., Sunnyvale, CA (US)

(72) Inventors: Jason Wong, Saratoga, CA (US); Lei Ming, San Jose, CA (US); Hyuck Jae Lee, San Francisco, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 13/753,408

(22) Filed: Jan. 29, 2013

(65) Prior Publication Data

US 2013/0212309 A1  Aug. 15, 2013

Related U.S. Application Data

(60) Provisional application No. 61/599,049, filed on Feb. 15, 2012.

(51) Int. Cl.
*G06F 13/42* (2006.01)
*H04L 1/16* (2006.01)
*G06F 13/40* (2006.01)

(52) U.S. Cl.
CPC .......... *G06F 13/42* (2013.01); *G06F 13/405* (2013.01); *H04L 1/1671* (2013.01)

(58) Field of Classification Search
CPC ......... G06F 13/42; G06F 15/16; H04L 1/1671
USPC ........ 710/106, 315, 105; 709/228, 218, 231, 709/237, 203
See application file for complete search history.

(56) References Cited

U.S. PATENT DOCUMENTS

| | | | |
|---|---|---|---|
| 6,275,948 B1 * | 8/2001 | Bays et al. ..................... | 713/320 |
| 7,742,438 B1 * | 6/2010 | Xu ........................ | H04L 1/1671 |
| | | | 370/278 |
| 7,975,025 B1 * | 7/2011 | Szabo et al. .................. | 709/218 |
| 2005/0232273 A1* | 10/2005 | Suzuki ................ | H04L 12/2803 |
| | | | 370/392 |

(Continued)

FOREIGN PATENT DOCUMENTS

| CN | 101193118 A * | 6/2008 |
|---|---|---|
| EP | 1827020 A2 | 8/2007 |

OTHER PUBLICATIONS

High-Definition Multimedia Interface Specification Version 1.3, HDMI Licensing, LLC, Jun. 22, 2006, 237 pages.

(Continued)

*Primary Examiner* — Tim T Vo
*Assistant Examiner* — Phong H Dang
(74) *Attorney, Agent, or Firm* — Fenwick & West LLP (57) ABSTRACT

Embodiments of the invention are generally directed to communication bridging between devices via multiple bridge elements. An embodiment of an apparatus includes a transmitter element to transmit data, and multiple bridge elements, the bridge elements including a first bridge element to receive data from the transmitter element and a second bridge element to provide data to a receiver. The bridge elements provide for one or more of translation of one or more commands for an operation from the transmitter element, wherein translation of commands includes handling of a command intended for the receiver, and prefetching of one or more data for the operation from the receiver.

26 Claims, 7 Drawing Sheets

(56) References Cited

U.S. PATENT DOCUMENTS

| | | | |
|---|---|---|---|
| 2007/0016618 A1* | 1/2007 | Robert | G06F 17/30147 |
| 2007/0147426 A1* | 6/2007 | Sharma | G06F 13/4221 |
| | | | 370/469 |
| 2007/0300266 A1* | 12/2007 | Casas | 725/81 |
| 2010/0271486 A1* | 10/2010 | Bohm | 348/180 |
| 2010/0313225 A1 | 12/2010 | Cholas et al. | |
| 2011/0029677 A1* | 2/2011 | Altmann | 709/228 |
| 2011/0075682 A1 | 3/2011 | Altmann | |
| 2011/0170011 A1* | 7/2011 | Choi et al. | 348/725 |
| 2012/0020475 A1 | 1/2012 | Altmann | |

OTHER PUBLICATIONS

International Search Report and Written Opinion of the International Searching Authority dated May 24, 2013, in International Patent Application No. PCT/US2013/025209, 11 pages.
European Extended Search Report, European Application No. 13749796.2, Jul. 24, 2015, 7 pages.

\* cited by examiner

COMMUNICATION BRIDGING BETWEEN DEVICES VIA MULTIPLE BRIDGE ELEMENTS

CROSS-REFERENCE TO RELATED APPLICATION

This application claims the benefit of priority from U.S. Provisional Patent Application No. 61/599,049 filed Feb. 15, 2012, which is incorporated herein by reference in its entirety.

TECHNICAL FIELD

Embodiments of the invention generally relate to the field of data transmission, and, more particularly, to communication bridging between devices via multiple bridge elements.

BACKGROUND

In the communication between devices, there may be multiple bridging devices or other elements utilizing different protocols for the purpose of transmitting data across a particular communication channel. In an example, a system or operation may utilize HDMI™ (High-Definition Multimedia Interface) and MHL™ (Mobile High-definition Link) protocols in the transmission of audio-visual and command data.

In such communications, the data may be required to be encrypted in transmission for security of the content data. For example, the transmission of HDMI and MHL data may utilize HDCP (High-bandwidth Digital Content Protection) encryption for security.

The transmission of signals between the multiple interfaces may be required to meet certain requirements, including certain timing requirements, for a certain protocol. For example, a protocol may require the completion of an operation within a certain amount of time.

However, the existence of multiple bridging elements may in certain circumstances cause a data transmission to use too much time, thereby causes a violation of the protocol timing limitations for the completion of an operation.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to communication bridging between devices via multiple bridge elements.

In a first aspect of the invention, an embodiment of an apparatus includes a transmitter element to transmit data, and multiple bridge elements, where the multiple bridge elements include a first bridge element to receive data from the transmitter element and a second bridge element to provide data to a receiver. The bridge elements provide for one or more of translation of one or more commands for an operation from the transmitter element, wherein translation of commands includes handling of a command intended for the receiver, and pre-fetching of one or more data for the operation from the receiver.

In a second aspect of the invention, an embodiment of a method includes receiving a request for operation of a transmitter element with a receiver, and performing the operation, performing the operation including transferring data for the requested operation between the transmitter element and a receiver via multiple bridge elements, wherein bridge elements include a first bridge element to receive data from the transmitter element and a second bridge element to provide data to the receiver. Performing the operation includes one or more of translation of one or more commands for an operation from the transmitter element, wherein translation of commands includes handling of a command intended for the receiver, and pre-fetching of one or more data for the operation from the receiver.

DETAILED DESCRIPTION

Embodiments of the invention are generally directed to communication bridging between devices via multiple bridge elements.

In some embodiments, an apparatus, system, or method utilizing multiple communication bridge devices or other elements provides for pre-fetching of transactions, translation of transactions, or both to improve efficiency of transmissions between devices.

In some embodiments, an interface includes multiple bridge devices or other elements from a first source (transmitting) apparatus to a second sink (receiving) apparatus. In some embodiments, the interface provides for pre-fetching of transaction, translating transactions, or both in an operation, such as in a read operation.

The transmission of commands via multiple bridge devices may create a significant delay in the transmission of messages and acknowledgements, and in the completion of the operation. In some embodiments, the pre-fetching, translating, or both of transactions reduces communication times for transaction, which may, for example, allow for meeting interface standard timing requirements.

In some embodiments, a method, apparatus, and system provide for pre-fetching or translating a DDC (Display Data Channel) transaction (HDCP Ri (High-bandwidth Digital Content Protection)) in a MHL (Mobile High-definition Link) to HDMI (High-Definition Multimedia Interface) or an HDMI to MHL bridge device. However, embodiments are not limited to bridge devices that are compatible with HDMI and MHL.

In some embodiments, an apparatus includes a transmitter element to transmit data, and multiple bridge elements, where the multiple bridge elements include a first bridge element to receive data from the transmitter element and a second bridge element to provide data to a receiver. The bridge elements provide for one or more of translation of one or more commands for an operation from the transmitter element, wherein translation of commands includes handling of a command intended for the receiver, and pre-fetching of one or more data for the operation from the receiver.

In some embodiments, a method includes receiving a request for operation of a transmitter element with a receiver, and performing the operation, performing the operation including transferring data for the requested operation between the transmitter element and a receiver via multiple bridge elements, wherein bridge elements include a first bridge element to receive data from the transmitter element and a second bridge element to provide data to the receiver. Performing the operation includes one or more of translation of one or more commands for an operation from the transmitter element, wherein translation of commands includes handling of a command intended for the receiver, and pre-fetching of one or more data for the operation from the receiver.

In some embodiments, a bridge module includes a control bus, a first bridge element coupled to the control bus, the first bridge element to receive data from a transmitter element, to convert the data from a first protocol to a second protocol, and to transmit the data in the second protocol via the control bus, and a second bridge element coupled to the control bus, the second bridge element to receive the data in the second protocol via the control bus, to convert the received data from the second protocol to the first protocol, and to provide the converted data in the second protocol to a receiver. The first and second bridge elements provide for one or more of translation of one or more commands for an operation from the transmitter element, wherein translation of commands includes handling of a command intended for the receiver, and pre-fetching of one or more data for the operation from the receiver.

Figure 1:
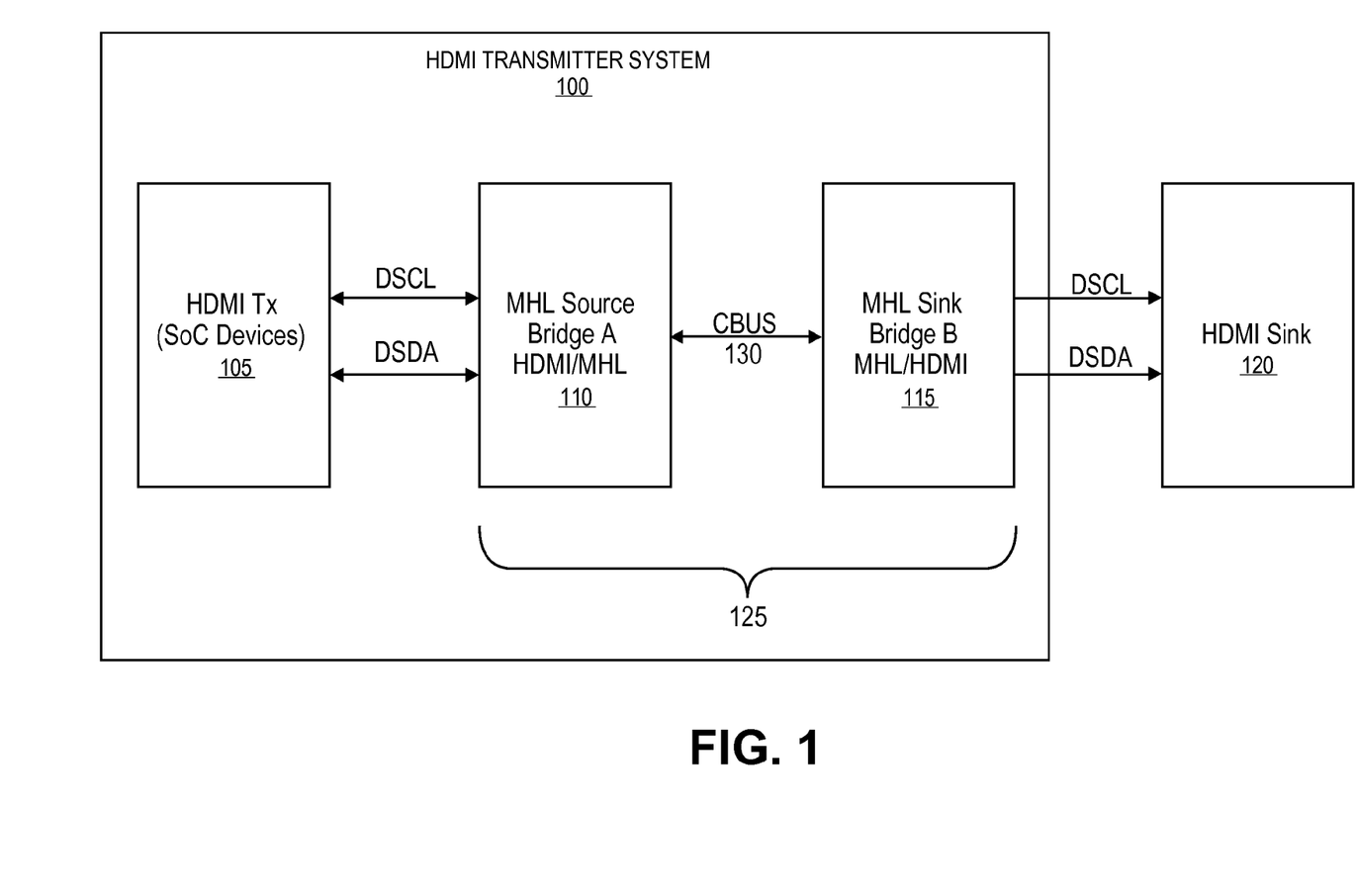
FIG. 1 is an illustration of an embodiment of an apparatus or system for transfer of data using pre-fetching or translation.

FIG. 1 is an illustration of an embodiment of an apparatus or system for transfer of data using pre-fetching or translation. In this illustration, an HDMI transmitter system 100 is coupled with an HDMI sink 120, where the connections include a data line (DSDA) and a clock line (DSCL). In some embodiments, the HDMI transmitter system 100 includes an HDMI transmitter element or module 105, which may include a system on chip (SoC) element. In some embodiments, the HDMI transmitter element or module may operate to transmit a read request or other request to the HDMI sink 120. In some embodiments, the HDMI transmitter system 100 is an HDCP compatible system to allow for the encryption of data for transmission to the HDMI compatible sink apparatus 120. However, embodiments are not limited to these protocols.

In some embodiments, the HDMI transmitter element or module 105 is coupled with a plurality of bridge devices or other elements 125, which may be referred to as a bridge module, for the transfer of signals, where the bridge elements may include in this example a first bridge device 110 (Bridge A), the first bridge device in this illustration providing for conversion of HDMI data to MHL data, and operating as an MHL source. In some embodiments, the first bridge device provides for the conversion of signals from HDMI to MHL, with the resulting data and clock signals being transferred via a channel that may include a control bus (CBUS) 130. In some embodiments, Bridge A is an HDMI to MHL bridge. In some embodiments, the first bridge device may be coupled with or provide data to a second bridge device 115 (Bridge B), the second bridge device 115 in this illustration operating as an MHL sink. The HDCP compatible transmitter 105 enforces locality on content by requiring that the round trip time (RTT) between a pair of messages to be no more than 1 ms (milliseconds).

Among possible communication are read operations to read data. An interface specification, such as the MHL specification, may have no restriction on the type of a transaction, and thus a handshaking mechanism (such as for two bytes of a Ri value) may exceed the HDCP specification time limitation of 1 ms. In some embodiments, by providing for pre-fetching of data or translating a sequential read to a short read, a system may provide for assurance that a bridge device will complete reading a value (such as all two bytes of the Ri) within the allotted time limit (such as 1 ms).

In some embodiments, an MHL/HDMI bridge device provides for pre-fetching DDC Ri (last byte) when an MHL Source issues a CBUS (Control Bus) DDC transaction of HDCP Ri Read (first byte).

A protocol may provide for multiple types of read operations. For example, in the MHL Specification, there are a number of methods for DDC read, where the methods include a short read, a bye handshaking read, and a byte handshake segment read. For an MHL/HDMI bridge device, translation from MHL DDC protocol to HDMI DDC protocol is required for downstream HDMI devices. However, in the HDCP specification, there is a timing requirement for Ri read requiring that such transaction be completed (involving the reading of two bytes) within 1.0 ms.

Figure 2:
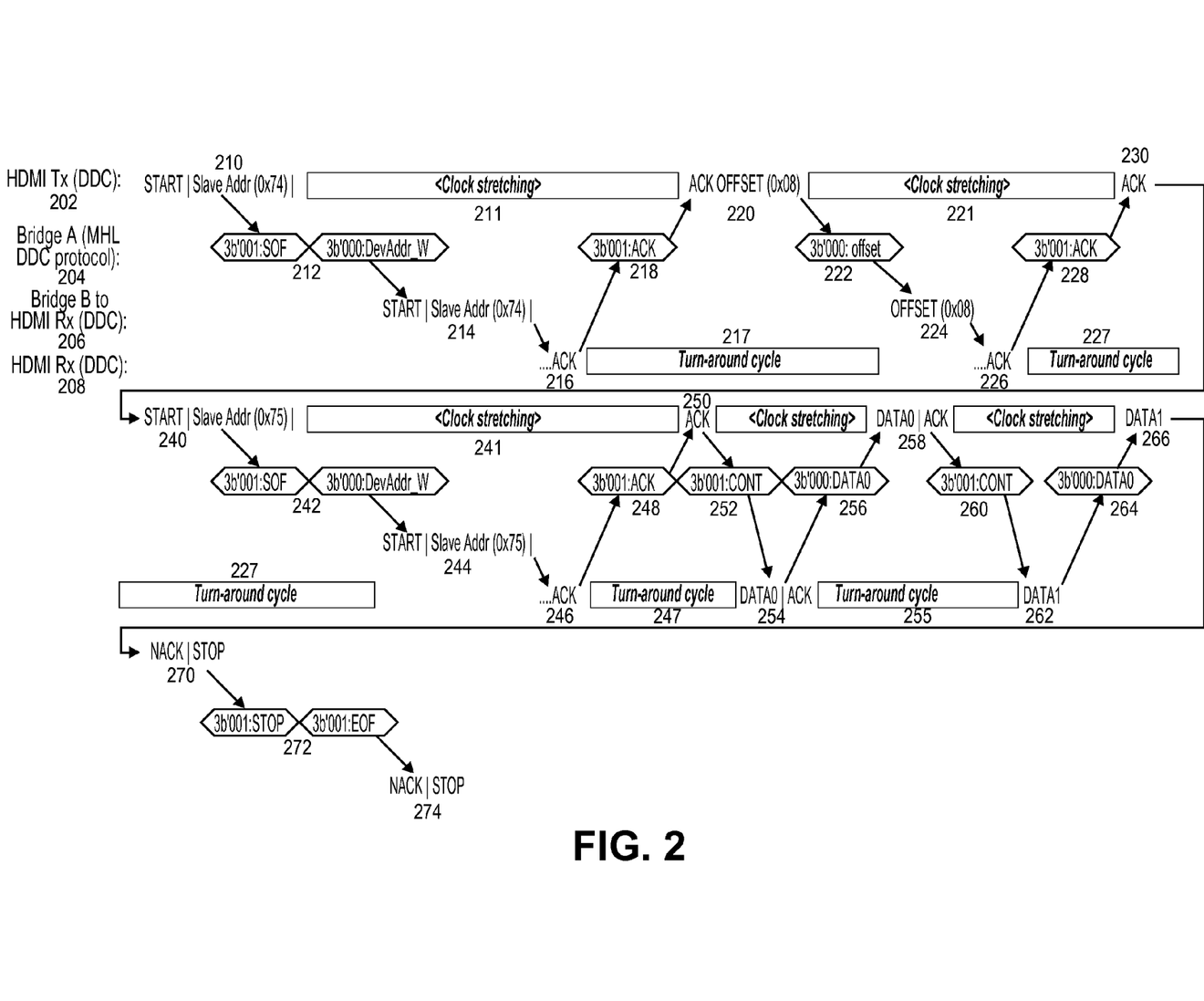
FIG. 2 is an illustration of communications between devices for a read operation.

FIG. 2 is an illustration of communications between devices for a read operation. In this illustration, the timing sequences for a sequential read are:

START|Slave Addr (0x74)|ACK|OFFSET (0x08)
|ACK|START|Slave Addr (0x75)
|ACK|DATA0|ACK|DATA1|NACK|STOP  [1]

In the example provided in Equation 1, the MHL DDC protocol on the CBUS is based on the HDMI transmitter source on the DDC lines (DSCL—clock line and DSDA—data Line). In this operation, an Ri sequential read originates from the HDMI Tx (105 in FIG. 1) and goes through two bridges (110 and 115) prior to reaching the HDMI Sink 120). When the address (Slave Address (0x74)) is received in Bridge A 110, Bridge A 110 will be clock stretching the HDMI transmitter (wherein clock stretching refers to a device or other element holding a clock value at a certain level, such as holding a clock low after sending or receiving data to indicate that the element is not ready to process additional data). During this time, the MHL DDC command is sent to Bridge B 115, and is converted back to HDMI DDC to wait for HDMI Sink's 120 response. A full handshaking mechanism is illustrated FIG. 2, which provides for operations at an HDMI transmitter (DDC) 202, bridge A (MHL DDC protocol) 204, bridge B (DDC) 206, and HDMI receiver (DDC) 208. As this illustration provides:

Transmitter: Start, Slave Address (0x74) 210, followed by the clock stretching period 211;
Bridge A: Data transmission to Bridge B 212;
Bridge B: Start, Slave Address (0x74) 214;
Receiver: Acknowledge (ACK) 216, followed by a turnaround cycle 217;
Bridge A: Data transmission to transmitter 218;
Transmitter: OFFSET (0x08) 220, clock stretching 221;
Bridge A: Data transmission to Bridge B 222;
Bridge B: OFFSET (0x08) 224;
Receiver: ACK 226, turn-around cycle 227;

Bridge A: Data transmission to transmitter 228;

Transmitter: ACK 230, allowing for start of read of data items:

Transmitter: START|Slave Address (0x75) 240, clock stretching 241;

Bridge A: Data transmission to Bridge B 242;

Bridge B: START|Slave Address (0x75) 244;

Receiver: Acknowledge 246, turn-around cycle 247;

Bridge A: Data transmission to transmitter 248;

Transmitter: Acknowledge 250, clock stretching 251;

Bridge A: Data transmission to receiver 252;

Receiver: Provide DATA0 254;

Bridge A: Data transmission to transmitter 256;

Transmitter: Receive DATA0 and acknowledge 258, clock stretching 259;

Bridge A: Data transmission to receiver 260;

Receiver: Provide DATA1 262;

Bridge A: Data transmission to transmitter 264;

Transmitter: Receive DATA1 266;

Transmitter: Negative acknowledge (NACK) and STOP 270;

Bridge A: Data transmission 272 to Bridge B; and

Bridge B: NACK and STOP 274.

In this illustration, it may be assumed that the DDC bus is running at a maximum frequency of 100 KHz and the sequential read instruction alone takes approximately 480 us on the output of the bridge device. When the Ri sequential read command is initiated from an MHL Source device, the Ri requirement of 1 ms will generally be met. However, the inclusion of multiple bridge devices, such as Bridge A 110 and Bridge B 115 illustrated in FIG. 1, creates additional delay, which creates an issue with regard to the time limit. The back-and-forth transmissions between a source device (such as HDMI Tx 105) and a sink device (such as HDMI sink 120) and the latency between the multiple bridges (such as bridges of the bridge module 125), as well as the clock stretching mechanism to the HDMI Tx, may result in an Ri read violation (>1 ms).

In some embodiments, a requirement for a source device (such as an HDMI transmitter) to initiate a Short Ri Read may provide a solution to the problem of a read timing violation. However, such a requirement may not be practical in operation. For example, this would create an extra requirement for MHL adaptors on their existing HDMI source (SoC).

In some embodiments, from a system point of view, there are at least four possible operations to modify communications in order meet a timing requirement (such as the <1 ms HDCP timing requirement), these operations being the following:

(1) Bridge A—Translate Method—In contrast to the timing sequence provided in Equation 1, a timing sequences for a sequential read (which may required 290 us based on 100 KHz DDC) is as follows in Equation 2:

START|Slave Addr (0x75)
|ACK|DATA0|ACK|DATA1|NACK|STOP     [2]

Figure 3:
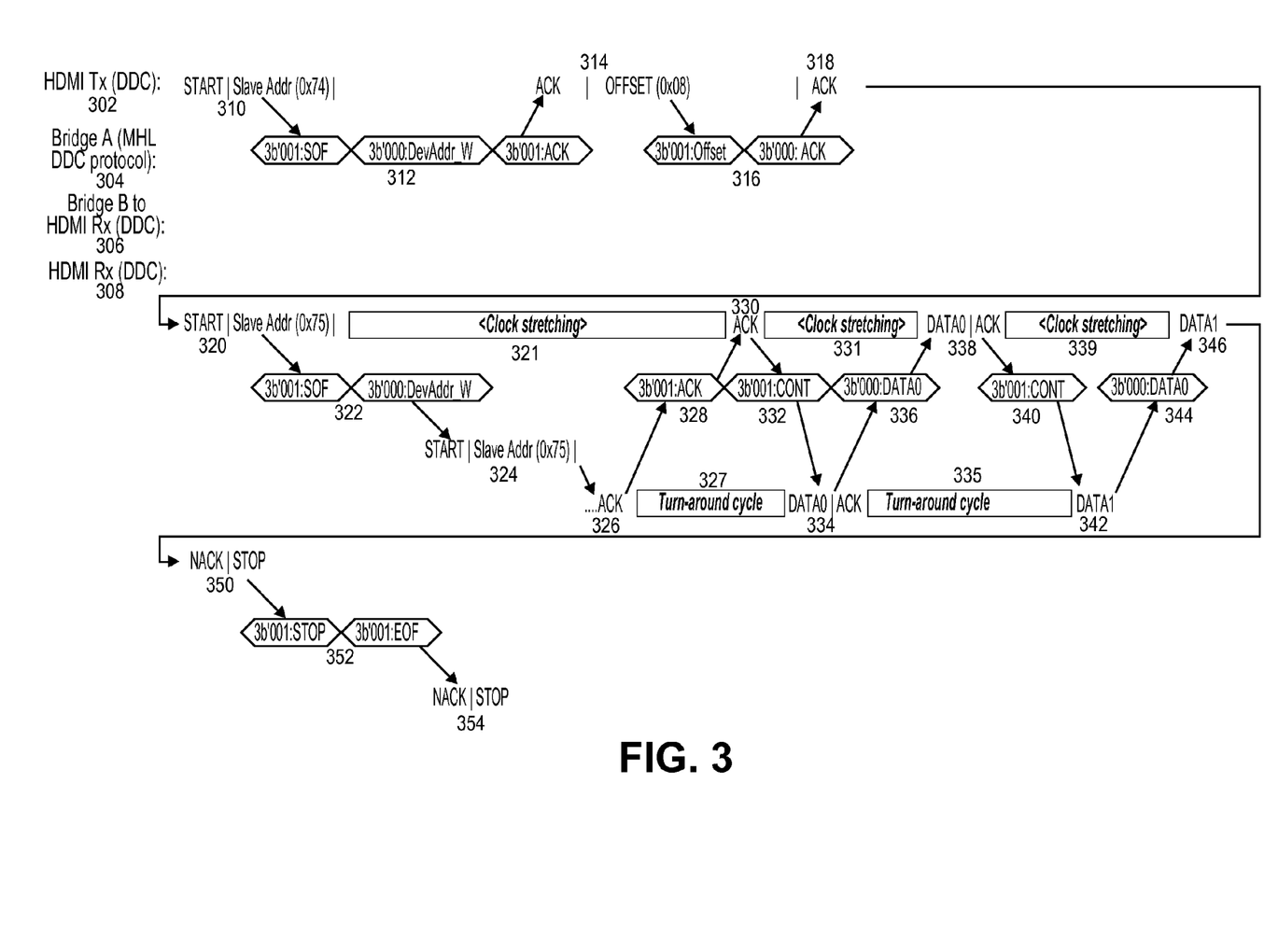
FIG. 3 illustrates an embodiment of a translation operation by a first bridge element for communications via a plurality of bridge elements.

FIG. 3 illustrates an embodiment of a translation operation by a first bridge element for communications via a plurality of bridge elements. In this illustration, the sequential read operation (as illustrated in FIG. 2) is modified to eliminate certain operations and clock stretching by the use of translation by a first bridge element of the plurality of bridge elements. In this operation, the sequential read of slave address 0x74 as well as the offset are stored locally first, and as a result clock stretching between Bridge A and the HDMI Tx is eliminated.

As illustrated in FIG. 3 for communications between an HDMI transmitter 302, a bridge A 304, a bridge B 306, and HDMI receiver 308, the operation provides:

Transmitter: Start, Slave Address (0x74) 310, no following clock stretching period;

Bridge A: Receive address and return ACK 312;

Transmitter: ACK received, OFFSET (0x08) 314;

Bridge A: Receive offset and return ACK 316;

Transmitter: Receive ACK 318, allowing for start of read of data items:

Transmitter: START|Slave Address (0x75) 320, clock stretching 321;

Bridge A: Data transmission to Bridge B 322;

Bridge B: START|Slave Address (0x75) 324;

Receiver: ACK 326, turn-around cycle 327;

Bridge A: Data transmission to transmitter 328;

Transmitter: ACK 330, clock stretching 331;

Bridge A: Data transmission to receiver 332;

Receiver: Provide DATA0 334, turn-around cycle 335;

Bridge A: Data transmission to transmitter 336;

Transmitter: Receive DATA0 and acknowledge 338, clock stretching 339;

Bridge A: Data transmission to receiver 340;

Receiver: Provide DATA1 342;

Bridge A: Data transmission to transmitter 344;

Transmitter: Receive DATA1 346;

Transmitter: NACK and STOP 350;

Bridge A: Data transmission 352 to Bridge B; and

Bridge B: NACK and STOP 354.

In some embodiments, bridge A operates to filter out 0x74 and offset 08 information, issuing only 0x75 as short Ri read protocol on the MHL side. As a result, the reflected DDC transaction on Bridge B will look like a short Ri Read to the HDMI Rx. Calculation time for Ri will start from 0x75, instead of 0x74 in the normal case of a sequential read (as shown in FIG. 2)

Figure 4:
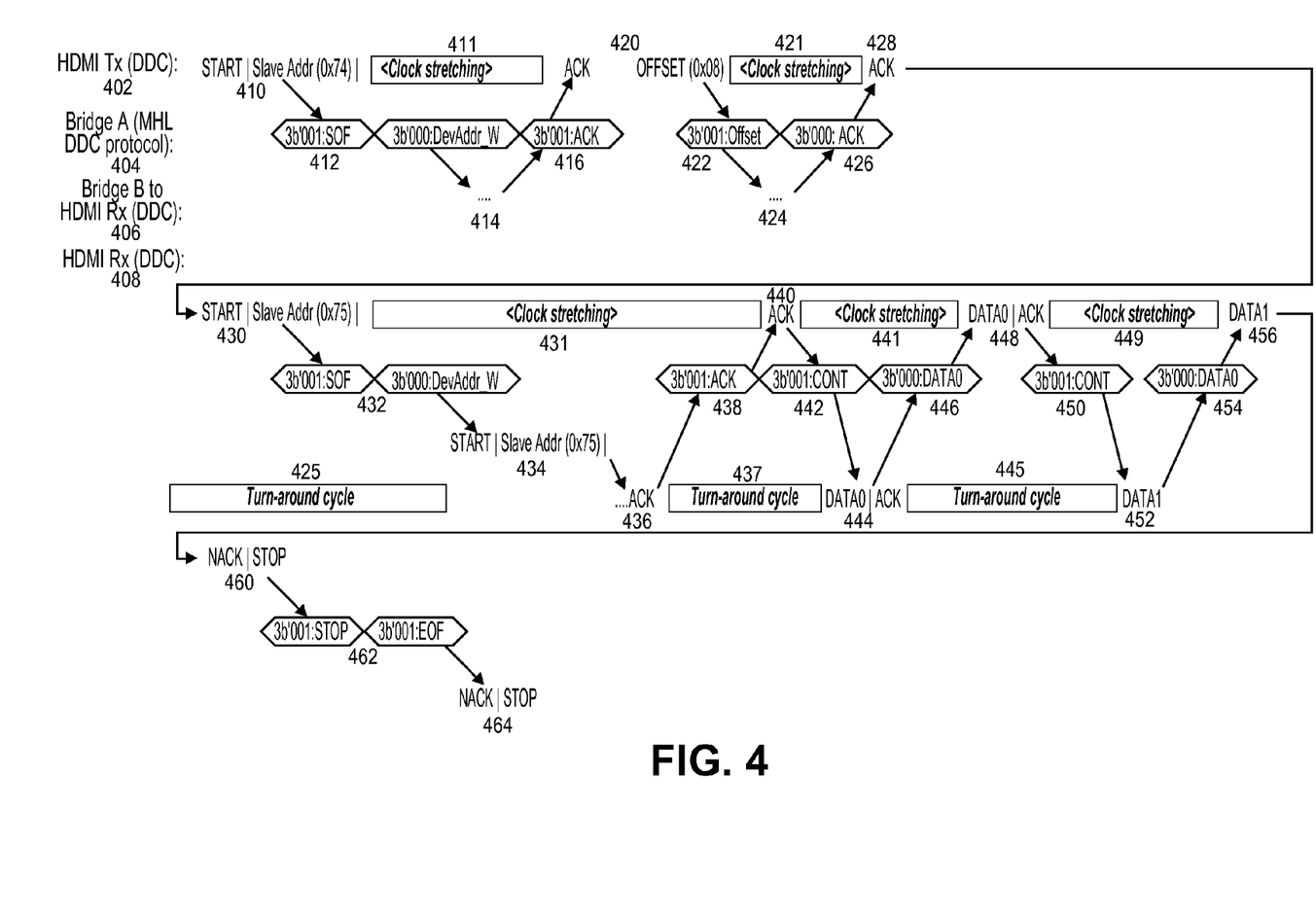
FIG. 4 illustrates an embodiment of a translation operation by a second bridge element for communications via a plurality of bridge elements.

(2) Bridge B—Translate Method—In some embodiments, as operation utilizes a similar operation as the (1) Bridge A—translate method. In some embodiments, a second bridge element, bridge B, provides for translation, rather than the first bridge element. FIG. 4 illustrates an embodiment of a translation operation by a second bridge element for communications via a plurality of bridge elements.

As illustrated in FIG. 4 for communications between an HDMI transmitter 402, a bridge A 404, a bridge B 406, and HDMI receiver 408, the operation provides:

Transmitter: Start, Slave Address (0x74) 410, followed by a reduced stretching period 411;

Bridge A: Data transmission to Bridge B 412;

Bridge B: Receive transmission and return ACK 414;

Bridge A: Data transmission to transmitter 416;

Transmitter: ACK received, OFFSET (0x08) 420;

Bridge A: Data transmission to Bridge B 422;

Bridge B: Receive offset and return ACK 424;

Bridge A: Data transmission to transmitter 426;

Transmitter: Receive ACK 428, allowing for start of read of data items:

Transmitter: START|Slave Address (0x75) 430, clock stretching 431;

Bridge A: Data transmission to Bridge B 432;

Bridge B: START|Slave Address (0x75) 434;

Receiver: ACK 436, turn-around cycle 437;

Bridge A: Data transmission to transmitter 438;

Transmitter: ACK 440, clock stretching 441;

Bridge A: Data transmission to receiver 442;

Receiver: Provide DATA0 and ACK 444, turn-around cycle 445;

Bridge A: Data transmission to transmitter 446;
Transmitter: Receive DATA0 and ACK 448, clock stretching 449;
Bridge A: Data transmission to receiver 450;
Receiver: Provide DATA1 452;
Bridge A: Data transmission to transmitter 454;
Transmitter: Receive DATA1 456;
Transmitter: NACK and STOP 460;
Bridge A: Data transmission to Bridge B 462; and
Bridge B: NACK and STOP 464.

In this illustration, bridge B operates to filter out 0x74 & offset of 08. An immediate MHL ACK when 0x74 416 will be provided to Bridge A, followed by the offset 420. The next SOF on MHL DDC protocol will then translate into HDMI DDC as short Ri Read.

Figure 5:
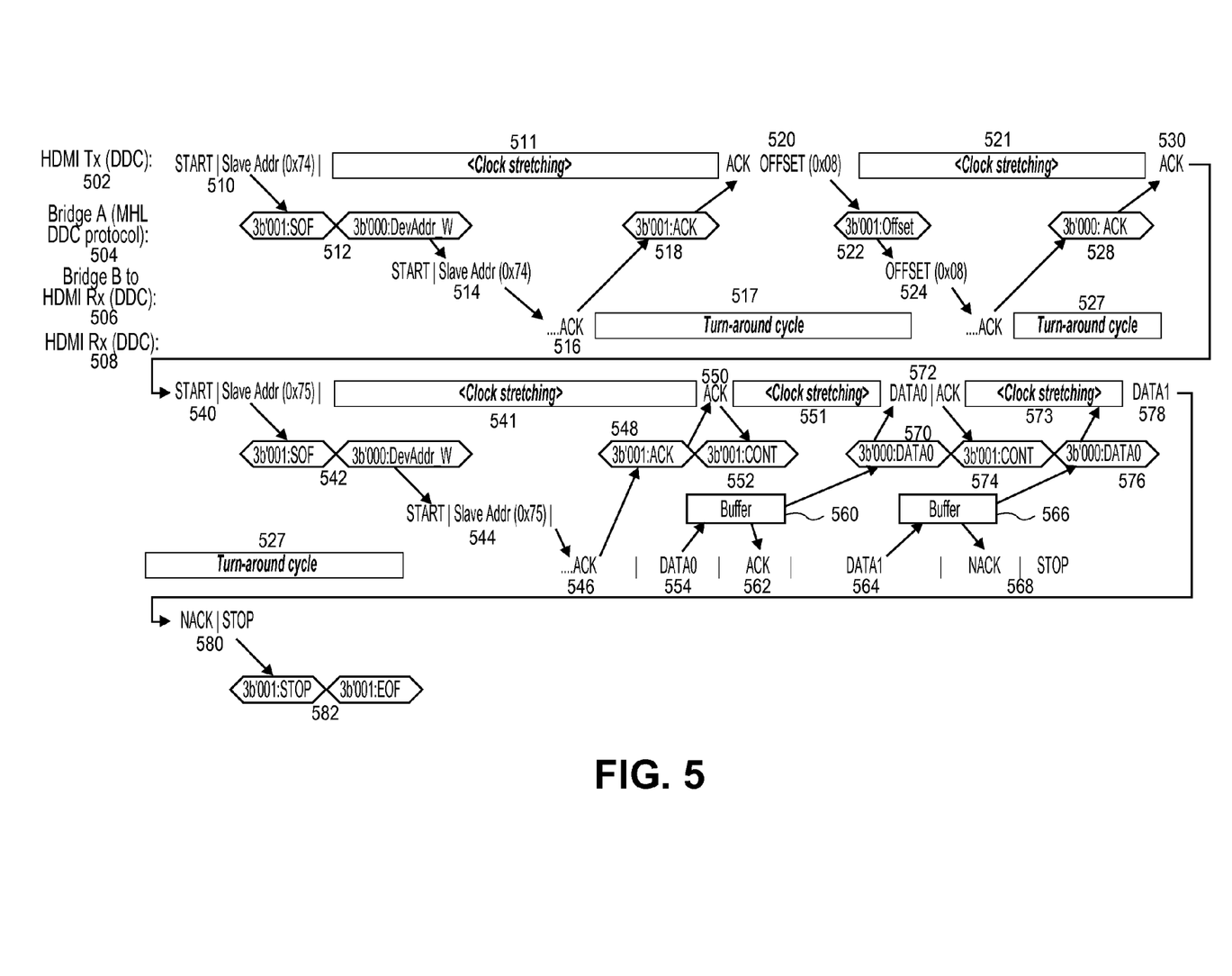
FIG. 5 illustrates an embodiment of a pre-fetch operation by a bridge element for communications via a plurality of bridge elements.

(3) Bridge B—Pre-Fetch—In some embodiments, a bridge element operates to pre-fetch data to address delay in transmission. FIG. 5 illustrates an embodiment of a pre-fetch operation by a bridge element for communications via a plurality of bridge elements.

As illustrated in FIG. 5 for communications between an HDMI transmitter 502, a bridge A 504, a bridge B 508, and HDMI receiver 508, the operation provides:
Transmitter: Start, Slave Address (0x74) 510, followed by a clock stretching period 511;
Bridge A: Data transmission to Bridge B 512;
Bridge B: Start, Slave Address (0x74) 514;
Receiver: Receive transmission and return ACK 516, turn-around cycle 517;
Bridge B: Data transmission to transmitter 518;
Transmitter: ACK received, OFFSET (0x08) 520;
Bridge A: Data transmission to Bridge B 522;
Bridge B: OFFSET (0x08) 524;
Receiver: Receive offset and return ACK 526, turn-around cycle 527;
Bridge A: Data transmission to transmitter 528;
Transmitter: Receive ACK 530, allowing for start of read of data items:
Transmitter: START|Slave Address (0x75) 540, clock stretching 541;
Bridge A: Data transmission to Bridge B 542;
Bridge B: START|Slave Address (0x75) 544;
Receiver: ACK 546;
Bridge A: Data transmission to transmitter 548;
Transmitter: ACK received 550 clock stretching 551;
Bridge A: Data received from transmitter 552, with pre-fetch operation in parallel by Bridge A:
Receiver: DATA0 554 to Buffer 560, which returns ACK 562;
Bridge A: Receive DATA0 from buffer, transmission to transmitter 570;
Transmitter: Receive DATA0 and ACK 572;
Bridge A: Data received from transmitter 574, with pre-fetch operation in parallel by Bridge A:
Receiver: DATA1 564 to Buffer 566, which returns NACK and STOP 568;
Bridge A: Receive DATA1 from buffer, transmission to transmitter 576;
Transmitter: Receive DATA1 578;
Transmitter: NACK and STOP 580; and
Bridge A: Receive transmission from transmitter, no further action required to complete transaction.

In some embodiments, a pre-fetching mechanism in a bridge, such as Bridge B 115 in FIG. 1, occurs in the data cycle. In some embodiments, an internal temporary storage (a buffer) will store DATA0 and DATA1 such that no turn-around cycles occur between Bridge B and the receiver (HDMI Rx device). In some embodiments, an immediate ACK is provided after DATA0 is received in the buffer, and following DATA1 being received there is a completed DDC transaction by NACK and STOP command. In an example, the overall Ri Read transaction from HDMI-Tx system (FIG. 1) point of view may be reduced utilizing the pre-fetch mechanism such that required time is within the 1 ms HDCP requirement.

(4) Bridge B—Translate and Pre-Fetch—In some embodiments, an apparatus, system, or method may combine operations for translation and pre-fetching, which may provide further improvement in transmission time. In some embodiments, the (2) and (3) operations are combined in a Bridge B configuration, wherein Bridge B provides both for translation of received commands, thereby reducing or eliminating clock stretching in a requested operation, and for pre-fetching of data, thereby reducing or eliminating clock stretching and turn-around cycle time.

Figure 6:
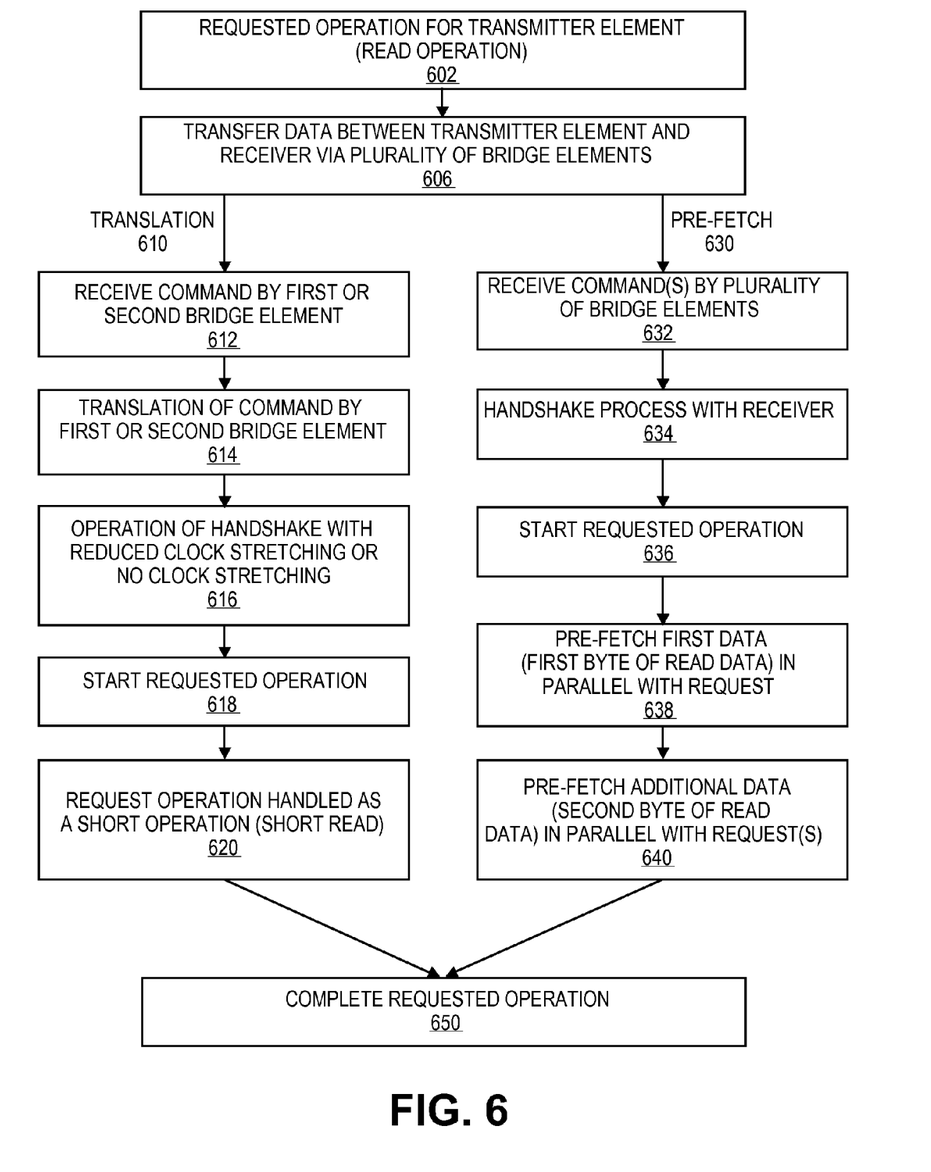
FIG. 6 illustrates an embodiment of a process for transmission of data via multiple bridge elements.

FIG. 6 illustrates an embodiment of a process for transmission of data via multiple bridge elements. In some embodiments, an operation request is sent by a transmitter element (such as HDMI transmitter 105 illustrated in FIG. 1), where the operation may be, for example, a read operation 602. The request is transmitted by the transmitter element to a plurality of bridge elements 606 (such as bridge elements 125).

In some embodiments, the process includes one or more sub-processes to increase the efficiency of data transmissions via the plurality of bridge elements, where the sub-processes may include the translation of operations to reduce processing in handshake operation 610 or the pre-fetching of data to allow for quicker transmission of data 630. In some embodiments, the one or more sub-processes may include both translation 610 and pre-fetching 630.

In some embodiments, translation 610 includes receiving a command from a transmitter by a first bridge element (the first bridge element being the initial bridge element receiving the command) or a second bridge element (the second bridge element being a subsequent bridge element receiving the command via the initial bridge element) 612, wherein the command is intended for a receiver. In some embodiments, the first or second bridge element provides translation of the command 614 to allow for handling at least a part of a handshake process without the receiver. In some embodiments, the translation of the command by the first or second bridge element allows for operation of the handshake process with reduced clock stretching or no clock stretching 616. The translation process continues with starting the requested operation (such as a read operation) 618, with the requested operation being handled as a short operation (such as a short read operation) 620. The process then provides for completion of the requested operation 650.

In some embodiments, pre-fetching 630 includes receiving one or more commands by the plurality of bridge elements 632, which may transfer such commands as needed to complete the normal handshake process with the receiver 634. In some embodiments, the operation may provided for starting the requested operation 636, where performing the operation includes pre-fetching a first data (such as a first byte of a read request) in parallel at least in part with the handling of a command requesting such data 638. In some embodiments, the pre-fetching includes a bridge element (such as Bridge B 115 in FIG. 1) pre-fetching the data from the receiver (such as HDMI Sink 120 in FIG. 1). In some embodiments, the pre-fetching may further include pre-fetching a second data (such as a second byte of a read request) in parallel at least in part with the handling of a command requesting such data 640. The process then provides for completion of the requested operation 650.

Figure 7:
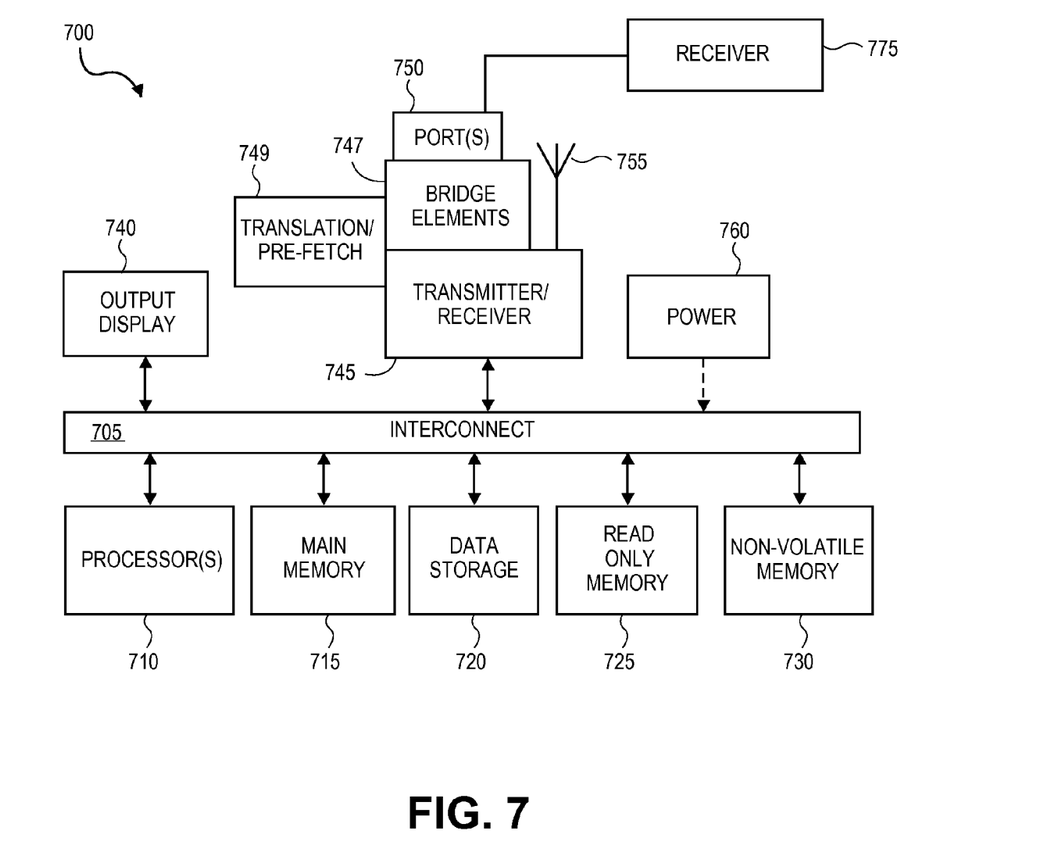
FIG. 7 illustrates an embodiment of an apparatus or system for transmission of data via multiple bridges.

FIG. 7 illustrates an embodiment of an apparatus or system for transmission of data via multiple bridges. The apparatus or system (referred to here generally as a system) may include, for example, an HDMI compatible transmitter system. However, embodiments are not limited to any particular protocol. In this illustration, certain standard and well-known components that are not germane to the present description are not shown. Under some embodiments, the system 700 comprises an interconnect or crossbar 705 or other communication means for transmission of data. The system 700 may include a processing means such as one or more processors 710 coupled with the interconnect 705 for processing information. The processors 710 may comprise one or more physical processors and one or more logical processors. The interconnect 705 is illustrated as a single interconnect for simplicity, but may represent multiple different interconnects or buses and the component connections to such interconnects may vary. The interconnect 705 shown in FIG. 7 is an abstraction that represents any one or more separate physical buses, point-to-point connections, or both connected by appropriate bridges, adapters, or controllers.

In some embodiments, the system 700 further comprises a random access memory (RAM) or other dynamic storage device or element as a main memory 715 for storing information and instructions to be executed by the processors 710. RAM memory includes dynamic random access memory (DRAM), which requires refreshing of memory contents, and static random access memory (SRAM), which does not require refreshing contents, but at increased cost. In some embodiments, main memory may include active storage of applications including a browser application for using in network browsing activities by a user of the system 700. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory.

The system 700 may include a data storage 720, including a hard disk drive or solid-state drive. The system 700 also may comprise a read only memory (ROM) 725 or other static storage device for storing static information and instructions for the processors 710. The system 700 may include one or more non-volatile memory elements 730 for the storage of certain elements, including, for example, flash memory.

The system 700 may also be coupled via the interconnect 705 to an output display 740. In some embodiments, the display 740 may include a liquid crystal display (LCD) or any other display technology, for displaying information or content to a user. In some environments, the display 740 may include a touch-screen that is also utilized as at least a part of an input device. In some environments, the display 740 may be or may include an audio device, such as a speaker for providing audio information.

One or more transmitters or receivers 745 may also be coupled to the interconnect 705. In some embodiments, the receivers or transmitters 745 may be coupled with multiple bridge elements 747 for the transmission of data in certain protocols, such as, for example, bridge elements 125 illustrated in FIG. 1. In some embodiments, the system 700 may include one or more ports 750 for the reception or transmission of data. The system 700 may further include one or more omnidirectional or directional antennas 755 for the reception of data via radio signals. In some embodiments, the bridge elements 747 may include translation, pre-fetch, or both capabilities 749 for the transmission of data from the system 700 to a receiver 775.

The system 700 may also comprise a power device or system 760, which may comprise a power supply, a battery, a solar cell, a fuel cell, or other system or device for providing or generating power. The power provided by the power device or system 760 may be distributed as required to elements of the system 700.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable non-transitory storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. An apparatus comprising:
   a data source element configured to provide audiovisual data to a receiver being authenticated using an authenticating protocol; and
   a first bridge element coupled between the data source element and the receiver, the first bridge element configured to:
      convert the audiovisual data from a first protocol to a second protocol;
      receive an operation command from the data source element, the operation command for receipt by the receiver and requiring a response from the receiver to the data source element within a predetermined time frame defined by the authenticating protocol, and
      handle the operation command for a read operation by responding to the data source element within the predetermined time frame without sending the operation command to the receiver by at least translating a sequential read command to a short read command by filtering out a slave address and an offset included in the sequential read command to handle at least a part of a handshake operation without the receiver thereby to reduce or eliminate clock stretching of the data source element caused by the sequential read command, the short read command requiring less time to complete than the sequential read command.

2. The apparatus of claim 1, wherein the first bridge element is coupled to a second bridge element via a control channel, the second bridge element coupled to the receiver.

3. The apparatus of claim 2, wherein the second bridge element is configured to convert the audiovisual data from the second protocol to the first protocol.

4. The apparatus of claim 3, wherein the first protocol is HDMI (High-Definition Multimedia Interface) protocol.

5. The apparatus of claim 4, wherein the second protocol is MHL (Mobile High-definition Link) protocol.

6. The apparatus of claim 1, wherein the operation command causes clock stretching of the data source element and the handling of the operation command reduces or eliminates the clock stretching of the data source element.

7. The apparatus of claim 1, wherein the audiovisual data is encrypted.

8. The apparatus of claim 7, wherein the response is a frame counter including a first byte and a second byte.

9. A method comprising:
   receiving an operation command from a data source element, the operation command for receipt by a receiver and requiring a response from the receiver to the data source element within a predetermined time frame defined by an authenticating protocol used for authenticating the receiver;
   receiving audiovisual data from the data source element for sending to the receiver;
   converting the audiovisual data, by a first bridge element between the data source element and the receiver element, from a first protocol to a second protocol;
   sending the converted audiovisual data to the receiver; and
   handle the operation command for a read operation by responding to the data source element within the predetermined time frame without sending the operation command to the receiver by at least translating a sequential read command to a short read command by filtering out a slave address and an offset included in the sequential read command to handle at least a part of a handshake operation without the receiver thereby to reduce or eliminate clock stretching of the data source element caused by the sequential read command, the short read command requiring less time to complete than the sequential read command.

10. The method of claim 9, further comprising converting the audiovisual data, by a second bridge element, from the second protocol to the first protocol, the second bridge element coupled between the first bridge element and the receiver.

11. The method of claim 9, wherein the operation command causes clock stretching of the data source element and the handling of the operation command reduces or eliminates the clock stretching of the data source element.

12. A non-transitory computer-readable storage medium having stored thereon data representing sequences of instructions that, when executed by a processor, cause the processor to perform operations comprising:
   receiving an operation command from a data source element, the operation command for receipt by a receiver and requiring a response from the receiver to the data source element within a predetermined time frame defined by an authenticating protocol used for authenticating the receiver;
   receiving audiovisual data from the data source element for sending to the receiver;
   converting the audiovisual data, by a first bridge element between the data source element and the receiver element, from a first protocol to a second protocol;
   sending the converted audiovisual data to the receiver; and
   handle the operation command for a read operation by responding to the data source element within the predetermined time frame without sending the operation command to the receiver by at least translating a sequential read command to a short read command by filtering out a slave address and an offset included in the sequential read command to handle at least a part of a handshake operation without the receiver thereby to reduce or eliminate clock stretching of the data source element caused by the sequential read command, the short read command requiring less time to complete than the sequential read command.

13. The apparatus of claim 1, wherein the first bridge element is further configured to pre-fetch or cause prefetching of at least a portion of the response from the receiver for authentication of the receiver in response to the operation command.

14. The method of claim 9, further comprising pre-fetching or causing pre-fetching, by the first bridge element, of at least a portion of the response from the receiver for authentication of the receiver in response to the operation command.

15. The method of claim 10, wherein the first protocol is HDMI (High-Definition Multimedia Interface) protocol.

16. The method of claim 15, wherein the second protocol is MHL (Mobile High-definition Link) protocol.

17. The method of claim 9, wherein the audiovisual data is encrypted.

18. The method of claim 17, wherein the response is a frame counter including a first byte and a second byte.

19. The non-transitory computer-readable storage medium of claim 12, wherein the instructions further cause the processor to perform pre-fetching or causing pre-fetching, by the first bridge element, of at least a portion of the response from the receiver for authentication of the receiver in response to the operation command.

20. The non-transitory computer-readable storage medium of claim 12, wherein the instructions further cause the processor to perform converting the audiovisual data, by a second bridge element, from the second protocol to the first protocol, the second bridge element coupled to the first bridge element and the receiver.

21. The non-transitory computer-readable storage medium of claim 12, wherein the first protocol is HDMI (High-Definition Multimedia Interface) protocol.

22. The non-transitory computer-readable storage medium of claim 21, wherein the second protocol is MHL (Mobile High-definition Link) protocol.

23. The non-transitory computer-readable storage medium of claim 12, wherein the operation command causes clock stretching of the data source element and the handling of the operation command reduces or eliminates the clock stretching of the data source element.

24. The apparatus of claim 1, wherein the authenticating protocol is HDCP (High-bandwidth Digital Content Protection) protocol.

25. The method of claim 9, wherein the authenticating protocol is HDCP (High-bandwidth Digital Content Protection) protocol.

26. The non-transitory computer-readable storage medium of claim 12, wherein the authenticating protocol is HDCP (High-bandwidth Digital Content Protection) protocol.

* * * * *